US011485869B2

(12) United States Patent
Lively et al.

(10) Patent No.: US 11,485,869 B2
(45) Date of Patent: Nov. 1, 2022

(54) SOLUTION-BASED ADDITIVE MANUFACTURING

(71) Applicant: Georgia Tech Research Corporation, Atlanta, GA (US)

(72) Inventors: Ryan P. Lively, Atlanta, GA (US); Laurens Victor Breedveld, Atlanta, GA (US); Fengyi Zhang, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 126 days.

(21) Appl. No.: 16/967,808

(22) PCT Filed: Feb. 8, 2019

(86) PCT No.: PCT/US2019/017248
§ 371 (c)(1),
(2) Date: Aug. 6, 2020

(87) PCT Pub. No.: WO2019/157307
PCT Pub. Date: Aug. 15, 2019

(65) Prior Publication Data
US 2021/0040343 A1    Feb. 11, 2021

Related U.S. Application Data

(60) Provisional application No. 62/627,835, filed on Feb. 8, 2018.

(51) Int. Cl.
*C09D 11/36* (2014.01)
*B33Y 10/00* (2015.01)
(Continued)

(52) U.S. Cl.
CPC ............ *C09D 11/36* (2013.01); *B29C 64/112* (2017.08); *B29C 64/209* (2017.08);
(Continued)

(58) Field of Classification Search
CPC ....... C09D 11/36; C09D 11/033; C09D 11/10; B29C 64/112; B29C 64/209;
(Continued)

(56) References Cited

U.S. PATENT DOCUMENTS 5,929,877 A    7/1999   Hetzer et al.
6,139,574 A    10/2000  Vacanti et al.
(Continued)

FOREIGN PATENT DOCUMENTS

GB    1218031    1/1971

OTHER PUBLICATIONS

International Search Report and Written Opinion from Application No. PCT/US2019/017248 dated Mar. 26, 2019 (12 pages).

*Primary Examiner* — Michael M. Robinson
(74) *Attorney, Agent, or Firm* — Troutman Pepper Hamilton Sanders LLP; Ryan A. Schneider

(57) ABSTRACT

Disclosed herein are solution-based additive manufacturing inks comprising a polymer, a volatile solvent compound, and a nonsolvent compound. With current additive manufacturing techniques, a wide range of functionally innovative polymers are left without the ability to be used in additive manufacturing. Improved additive manufacturing techniques to process advanced functional polymers are desirable. The disclosed ink is operable to render any chosen polymer useable in additive manufacturing methods. The composition of the disclosed ink allows for a phase inversion to occur to transition the ink from a liquid ink to a solid manufactured structure. Also disclosed herein are devices for additive manufacturing of the ink and methods for making the same.

25 Claims, 8 Drawing Sheets

(51) Int. Cl.

| | |
|---|---|
| *B33Y 70/00* | (2020.01) |
| *B29C 64/112* | (2017.01) |
| *B29C 64/209* | (2017.01) |
| *B29C 64/371* | (2017.01) |
| *C09D 11/033* | (2014.01) |
| *C09D 11/10* | (2014.01) |
| *B33Y 30/00* | (2015.01) |
| *B33Y 50/02* | (2015.01) |
| *B29C 64/321* | (2017.01) |
| *B29C 64/245* | (2017.01) |
| *B29C 64/393* | (2017.01) |
| *B29C 64/236* | (2017.01) |
| *B29C 64/35* | (2017.01) |
| *B33Y 40/20* | (2020.01) |
| *B29K 1/00* | (2006.01) |
| *B29K 79/00* | (2006.01) |

(52) U.S. Cl.
CPC ............ *B29C 64/371* (2017.08); *B33Y 10/00* (2014.12); *B33Y 70/00* (2014.12); *C09D 11/033* (2013.01); *C09D 11/10* (2013.01); *B29C 64/236* (2017.08); *B29C 64/245* (2017.08); *B29C 64/321* (2017.08); *B29C 64/35* (2017.08); *B29C 64/393* (2017.08); *B29K 2001/12* (2013.01); *B29K 2079/085* (2013.01); *B33Y 30/00* (2014.12); *B33Y 40/20* (2020.01); *B33Y 50/02* (2014.12)

(58) Field of Classification Search
CPC ... B29C 64/371; B29C 64/236; B29C 64/245; B29C 64/321; B29C 64/35; B29C 64/393; B33Y 10/00; B33Y 70/00; B33Y 30/00; B33Y 40/20; B33Y 50/00; B29K 2001/12; B29K 2079/085
See application file for complete search history.

(56) References Cited

U.S. PATENT DOCUMENTS

| | | | |
|---|---|---|---|
| 6,344,497 B1 * | 2/2002 | Meyrick | C09B 53/02 523/160 |
| 2006/0014847 A1 | 1/2006 | Cohen et al. | |
| 2010/0174399 A1 * | 7/2010 | Silverbrook | B29C 64/112 700/120 |
| 2015/0190834 A1 * | 7/2015 | Clarke | B05D 1/02 239/104 |
| 2016/0039120 A1 | 2/2016 | Dikovsky et al. | |
| 2016/0096324 A1 | 4/2016 | Giller | |
| 2017/0260418 A1 | 9/2017 | Wu et al. | |
| 2019/0054536 A1 * | 2/2019 | Xu | B33Y 10/00 |
| 2021/0252777 A1 * | 8/2021 | Angelini | B29C 64/106 |

\* cited by examiner

SOLUTION-BASED ADDITIVE MANUFACTURING

CROSS-REFERENCE TO RELATED APPLICATIONS

This application claims the benefit, under 35 U.S.C. § 119(e), of U.S. Provisional Patent Application No. 62/627,835, filed 8 Feb. 2018, entitled "SOLUTION-BASED 3D PRINTING," the entire contents and substance of which is incorporated herein by reference in its entirety as if fully set forth below.

FIELD OF THE DISCLOSURE

The present disclosure relates generally to additive manufacturing techniques and methods of improving the same. Particularly, embodiments of the present disclosure relate to solution-based additive manufacturing techniques for creating polymer structures.

BACKGROUND

Additive manufacturing techniques such as 3D printing have revolutionized manufacturing because these techniques can produce complex structures that are difficult or near impossible to create using traditional manufacturing methods. Additive manufacturing has found wide industrial use in emerging areas of innovation, such as microfluidic devices, structured biomaterials, improved composite materials, and high-strength materials. A critical limitation of existing and emerging additive manufacturing techniques is the narrow range of polymers that can be processed. For instance, current methods require specific polymers such as thermoplastic polymers with moderate melting points, or polymers which must be photopolymerized or photocrosslinked. A wide range of functionally innovative polymers, therefore, are left without the ability to be used in additive manufacturing. Improved additive manufacturing techniques to process advanced functional polymers are desirable.

What is needed, therefore, is an additive manufacturing technique capable of transition any desired polymer solution from a liquid ink phase to a solid printed phase without the need to limit the polymer selection based on the melting points or photoreactivity of the polymer. Embodiments of the present disclosure address this need as well as other needs that will become apparent upon reading the description below in conjunction with the drawings.

BRIEF SUMMARY OF THE INVENTION

The present invention relates to systems and method for additive manufacturing. An exemplary embodiment of the present invention provides a method of additive manufacturing. The method can comprise providing an ink and depositing, through an air gap and onto a substrate, the ink to create an extruded polymer structure. The ink can comprise a polymer, a volatile solvent compound, and a nonsolvent compound.

In any of the embodiments disclosed herein, the method can further comprise evaporating at least a portion of the volatile solvent compound.

In any of the embodiments disclosed herein, the at least a portion of the volatile solvent compound can be 20% or less of the volatile solvent compound by weight based on total weight of the ink, and the evaporating causes a phase change in the ink from a liquid ink phase to a solid extruded phase.

In any of the embodiments disclosed herein, the at least a portion of the volatile solvent compound is 15% or less of the volatile solvent compound by weight based on total weight of the ink, and the evaporating causes a phase change in the ink from a liquid ink phase to a solid extruded phase.

In any of the embodiments disclosed herein, the at least a portion of the volatile solvent compound is 10% or less of the volatile solvent compound by weight based on total weight of the ink, and the evaporating causes a phase change in the ink from a liquid ink phase to a solid extruded phase.

In any of the embodiments disclosed herein, the at least a portion of the volatile solvent compound is 5% or less of the volatile solvent compound by weight based on total weight of the ink, and the evaporating causes a phase change in the ink from a liquid ink phase to a solid extruded phase.

In any of the embodiments disclosed herein, the at least a portion of the volatile solvent compound is 3% or less of the volatile solvent compound by weight based on total weight of the ink, and the evaporating causes a phase change in the ink from a liquid ink phase to a solid extruded phase.

In any of the embodiments disclosed herein, the at least a portion of the volatile solvent compound is 2% or less of the volatile solvent compound by weight based on total weight of the ink, and the evaporating causes a phase change in the ink from a liquid ink phase to a solid extruded phase.

In any of the embodiments disclosed herein, the at least a portion of the volatile solvent compound is 1% or less of the volatile solvent compound by weight based on total weight of the ink, and the evaporating causes a phase change in the ink from a liquid ink phase to a solid extruded phase.

In any of the embodiments disclosed herein, the at least a portion of the volatile solvent compound is at least 0.1% of the volatile solvent compound by weight based on total weight of the ink.

In any of the embodiments disclosed herein, the at least a portion of the volatile solvent compound is at least 0.3% of the volatile solvent compound by weight based on total weight of the ink.

In any of the embodiments disclosed herein, the at least a portion of the volatile solvent compound is at least 0.5% of the volatile solvent compound by weight based on total weight of the ink.

In any of the embodiments disclosed herein, the at least a portion of the volatile solvent compound is at least 0.7% of the volatile solvent compound by weight based on total weight of the ink.

In any of the embodiments disclosed herein, the at least a portion of the volatile solvent compound is at least 0.9% of the volatile solvent compound by weight based on total weight of the ink.

In any of the embodiments disclosed herein, the method can further comprise washing, with one or more nonsolvent compounds, the extruded polymer structure.

In any of the embodiments disclosed herein, the method can further comprise drying, at low temperature, the extruded polymer structure to remove residual solvent.

In any of the embodiments disclosed herein, the depositing can occur through a pneumatic micronozzle.

In any of the embodiments disclosed herein, the method can further comprise coating the substrate with a coating layer comprising the polymer to enhance binding between the extruded polymer structure and the substrate.

In any of the embodiments disclosed herein, the substrate can comprise a plate comprising the polymer.

In any of the embodiments disclosed herein, the method can further comprise injecting, using a vapor nozzle, a vapor comprising the volatile solvent compound to a shell substantially surrounding the nozzle and the air gap.

In any of the embodiments disclosed herein, the method can further comprise saturating, with the vapor comprising the volatile solvent compound, the atmosphere in the shell substantially surrounding the nozzle and the air gap such that the evaporation of the volatile solvent compound from the ink is slowed.

In any of the embodiments disclosed herein, the method can further comprise saturating, with the vapor comprising the volatile solvent compound, the atmosphere surrounding the extruded polymer structure to slow the evaporation of the volatile solvent compound.

In any of the embodiments disclosed herein, the method can further comprise moving, laterally in an x-direction and a y-direction, the substrate.

In any of the embodiments disclosed herein, the method can further comprise moving, vertically in a z-direction, the nozzle.

In any of the embodiments disclosed herein, the method can further comprise controlling, by adjusting the movement speed of the substrate, the diameter of the ink extrusion on the substrate.

In any of the embodiments disclosed herein, the method can further comprise layering, by adjusting the vertical height of the nozzle, two or more layers on the substrate to create the extruded polymer structure.

In any of the embodiments disclosed herein, the method can further comprise pressurizing the ink.

In any of the embodiments disclosed herein, the method can further comprise cutting, off from the substrate, the extruded polymer structure.

In any of the embodiments disclosed herein, the method can further comprise immersing the substrate and the extruded polymer structure in a water bath after printing a 3D structure.

In any of the embodiments disclosed herein, the nonsolvent compound can comprise a volatile nonsolvent compound.

In any of the embodiments disclosed herein, the method can further comprise evaporating at least a portion of the volatile nonsolvent compound.

In any of the embodiments disclosed herein, the method can further comprise immersing the extruded polymer structure in a bath comprising a plasticizing nonsolvent compound.

In any of the embodiments disclosed herein, the method can further comprise annealing, in a vacuum oven, the extruded polymer structure.

Another embodiment of the present invention provides a three-dimensional direct ink writing printer for additive manufacturing. The printer can comprise an ink holding container, an ink nozzle configured to attach to the ink holding container, a vapor nozzle, and a moving stage for a substrate. A distance between the ink nozzle and the moving stage can comprises an air gap substantially surrounded by a control volume shell. The vapor nozzle can be configured to provide a feed into the control volume shell.

In any of the embodiments disclosed herein, the moving stage can be configured to move laterally in an x-direction and a y-direction.

In any of the embodiments disclosed herein, the ink holding container and the ink nozzle can be configured to move vertically in a z-direction.

In any of the embodiments disclosed herein, the vapor nozzle can be configured to control a vapor concentration of a volatile solvent compound in the control volume shell.

In any of the embodiments disclosed herein, the vapor nozzle can be configured to saturate the control volume shell with the vapor comprising the volatile solvent compound.

In any of the embodiments disclosed herein, the moving stage can be configured to detachably attach to a substrate.

In any of the embodiments disclosed herein, the vapor nozzle can be further configured to saturate the substrate with the vapor comprising the volatile solvent.

In any of the embodiments disclosed herein, the ink holding container and the ink nozzle comprise stainless steel.

In any of the embodiments disclosed herein, the printer can further comprise one or more stepper motors attached to the moving stage and ink nozzle and configured with a predetermined step angle to move the moving stage and ink nozzle.

In any of the embodiments disclosed herein, the printer can further comprise one or more controllers attached to the one or more stepper motors and configured to control the moving stage and the ink nozzle.

In any of the embodiments disclosed herein, the one or more controllers can be configured to adjust the movement speed of the moving stage to control the diameter of the ink extrusion on the substrate.

In any of the embodiments disclosed herein, the one or more controllers can be configured to move the moving stage laterally.

In any of the embodiments disclosed herein, the one or more controllers can be configured to move the ink holding container and the ink nozzle vertically.

In any of the embodiments disclosed herein, the printer can further comprise a coating layer on the substrate comprising a polymer to enhance binding capabilities of the substrate.

In any of the embodiments disclosed herein, the substrate can comprise a plate comprising a polymer.

Another embodiment of the present invention provides a solution-based polymeric ink for additive manufacturing. The ink can comprise a polymer, a volatile solvent compound, and a nonsolvent compound. The weight ratios of the polymer, volatile solvent compound, and nonsolvent compound can be present in an amount such that evaporation, at 23° C. and 1 atm, of 20% or less of the volatile solvent compound by weight based on total weight of the ink results in a phase change in the ink from a liquid ink phase to a solid extruded phase.

In any of the embodiments disclosed herein, the Hildebrand solubility parameters of the polymer and volatile solvent compound can have a difference of 3.6 MPa1/2 or less.

In any of the embodiments disclosed herein, the Relative Energy Difference calculated from the Hansen solubility parameters of the polymer and the nonsolvent compound can be 1 or greater.

In any of the embodiments disclosed herein, the volatile solvent compound can have a vapor pressure greater than the nonsolvent compound.

In any of the embodiments disclosed herein, the weight ratios of the polymer, volatile solvent compound, and nonsolvent compound can be present in an amount such that evaporation, at 23° C. and 1 atm, of 15% or less of the volatile solvent compound by weight based on total weight of the ink results in a phase change in the ink from a liquid ink phase to a solid extruded phase.

In any of the embodiments disclosed herein, the weight ratios of the polymer, volatile solvent compound, and nonsolvent compound can be present in an amount such that evaporation, at 23° C. and 1 atm, of 10% or less of the volatile solvent compound by weight based on total weight of the ink results in a phase change in the ink from a liquid ink phase to a solid extruded phase.

In any of the embodiments disclosed herein, the weight ratios of the polymer, volatile solvent compound, and nonsolvent compound can be present in an amount such that evaporation, at 23° C. and 1 atm, of 5% or less of the volatile solvent compound by weight based on total weight of the ink results in a phase change in the ink from a liquid ink phase to a solid extruded phase.

In any of the embodiments disclosed herein, the weight ratios of the polymer, volatile solvent compound, and nonsolvent compound can be present in an amount such that evaporation, at 23° C. and 1 atm, of 3% or less of the volatile solvent compound by weight based on total weight of the ink results in a phase change in the ink from a liquid ink phase to a solid extruded phase.

In any of the embodiments disclosed herein, the weight ratios of the polymer, volatile solvent compound, and nonsolvent compound can be present in an amount such that evaporation, at 23° C. and 1 atm, of 2% or less of the volatile solvent compound by weight based on total weight of the ink results in a phase change in the ink from a liquid ink phase to a solid extruded phase.

In any of the embodiments disclosed herein, the weight ratios of the polymer, volatile solvent compound, and nonsolvent compound can be present in an amount such that evaporation, at 23° C. and 1 atm, of 1% or less of the volatile solvent compound by weight based on total weight of the ink results in a phase change in the ink from a liquid ink phase to a solid extruded phase.

In any of the embodiments disclosed herein, the weight ratios of the polymer, volatile solvent compound, and nonsolvent compound can be present in an amount such that evaporation, at 23° C. and 1 atm, of at least 0.1% or less of the volatile solvent compound by weight based on total weight of the ink results in a phase change in the ink from a liquid ink phase to a solid extruded phase.

In any of the embodiments disclosed herein, the weight ratios of the polymer, volatile solvent compound, and nonsolvent compound can be present in an amount such that evaporation, at 23° C. and 1 atm, of at least 0.3% or less of the volatile solvent compound by weight based on total weight of the ink results in a phase change in the ink from a liquid ink phase to a solid extruded phase.

In any of the embodiments disclosed herein, the weight ratios of the polymer, volatile solvent compound, and nonsolvent compound can be present in an amount such that evaporation, at 23° C. and 1 atm, of at least 0.5% or less of the volatile solvent compound by weight based on total weight of the ink results in a phase change in the ink from a liquid ink phase to a solid extruded phase.

In any of the embodiments disclosed herein, the weight ratios of the polymer, volatile solvent compound, and nonsolvent compound can be present in an amount such that evaporation, at 23° C. and 1 atm, of at least 0.7% or less of the volatile solvent compound by weight based on total weight of the ink results in a phase change in the ink from a liquid ink phase to a solid extruded phase.

In any of the embodiments disclosed herein, the weight ratios of the polymer, volatile solvent compound, and nonsolvent compound can be present in an amount such that evaporation, at 23° C. and 1 atm, of at least 0.9% or less of the volatile solvent compound by weight based on total weight of the ink results in a phase change in the ink from a liquid ink phase to a solid extruded phase.

In any of the embodiments disclosed herein, the weight ratio of the volatile solvent compound can be present in an amount such that, when the ink is at 23° C. and 1 atm, the polymer is dissolved in an amount of 10% or greater by weight based on total weight of the ink to form a homogeneous solution.

In any of the embodiments disclosed herein, the weight ratio of the volatile solvent compound can be present in an amount such that, when the ink is at 23° C. and 1 atm, the polymer is dissolved in an amount of 15% or greater by weight based on total weight of the ink to form a homogeneous solution.

In any of the embodiments disclosed herein, the weight ratio of the volatile solvent compound can be present in an amount such that, when the ink is at 23° C. and 1 atm, the polymer is dissolved in an amount of 20% or greater by weight based on total weight of the ink to form a homogeneous solution.

In any of the embodiments disclosed herein, the weight ratio of the volatile solvent compound can be present in an amount such that, when the ink is at 23° C. and 1 atm, the polymer is dissolved in an amount of 25% or greater by weight based on total weight of the ink to form a homogeneous solution.

In any of the embodiments disclosed herein, the weight ratio of the volatile solvent compound can be present in an amount such that, when the ink is at 23° C. and 1 atm, the polymer is dissolved in an amount of 30% or greater by weight based on total weight of the ink to form a homogeneous solution.

In any of the embodiments disclosed herein, the weight ratio of the volatile solvent compound can be present in an amount such that, when the ink is at 23° C. and 1 atm, the polymer is dissolved in an amount of 40% or greater by weight based on total weight of the ink to form a homogeneous solution.

In any of the embodiments disclosed herein, the weight ratio of the volatile solvent compound can be present in an amount such that, when the ink is at 23° C. and 1 atm, the polymer is dissolved in an amount of 50% or greater by weight based on total weight of the ink to form a homogeneous solution.

In any of the embodiments disclosed herein, wherein the weight ratio of the nonsolvent compound can be present in an amount such that, when the ink is at 23° C. and 1 atm, the polymer is dissolved in an amount of 1% or less by weight based on total weight of the ink to form a homogeneous solution.

In any of the embodiments disclosed herein, wherein the weight ratio of the nonsolvent compound can be present in an amount such that, when the ink is at 23° C. and 1 atm, the polymer is dissolved in an amount of 1% or less by weight based on total weight of the ink to form a homogeneous solution.

In any of the embodiments disclosed herein, wherein the weight ratio of the nonsolvent compound can be present in an amount such that, when the ink is at 23° C. and 1 atm, the polymer is dissolved in an amount of 0.9% or less by weight based on total weight of the ink to form a homogeneous solution.

In any of the embodiments disclosed herein, wherein the weight ratio of the nonsolvent compound can be present in an amount such that, when the ink is at 23° C. and 1 atm, the polymer is dissolved in an amount of 0.8% or less by weight based on total weight of the ink to form a homogeneous solution.

In any of the embodiments disclosed herein, wherein the weight ratio of the nonsolvent compound can be present in an amount such that, when the ink is at 23° C. and 1 atm, the polymer is dissolved in an amount of 0.7% or less by weight based on total weight of the ink to form a homogeneous solution.

In any of the embodiments disclosed herein, wherein the weight ratio of the nonsolvent compound can be present in an amount such that, when the ink is at 23° C. and 1 atm, the polymer is dissolved in an amount of 0.6% or less by weight based on total weight of the ink to form a homogeneous solution.

In any of the embodiments disclosed herein, wherein the weight ratio of the nonsolvent compound can be present in an amount such that, when the ink is at 23° C. and 1 atm, the polymer is dissolved in an amount of 0.5% or less by weight based on total weight of the ink to form a homogeneous solution.

In any of the embodiments disclosed herein, wherein the weight ratio of the nonsolvent compound can be present in an amount such that, when the ink is at 23° C. and 1 atm, the polymer is dissolved in an amount of 0.4% or less by weight based on total weight of the ink to form a homogeneous solution.

In any of the embodiments disclosed herein, wherein the weight ratio of the nonsolvent compound can be present in an amount such that, when the ink is at 23° C. and 1 atm, the polymer is dissolved in an amount of 0.3% or less by weight based on total weight of the ink to form a homogeneous solution.

In any of the embodiments disclosed herein, wherein the weight ratio of the nonsolvent compound can be present in an amount such that, when the ink is at 23° C. and 1 atm, the polymer is dissolved in an amount of 0.2% or less by weight based on total weight of the ink to form a homogeneous solution.

In any of the embodiments disclosed herein, wherein the weight ratio of the nonsolvent compound can be present in an amount such that, when the ink is at 23° C. and 1 atm, the polymer is dissolved in an amount of 0.1% or less by weight based on total weight of the ink to form a homogeneous solution.

These and other aspects of the present invention are described in the Detailed Description of the Invention below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

DETAILED DESCRIPTION

Figure 1:
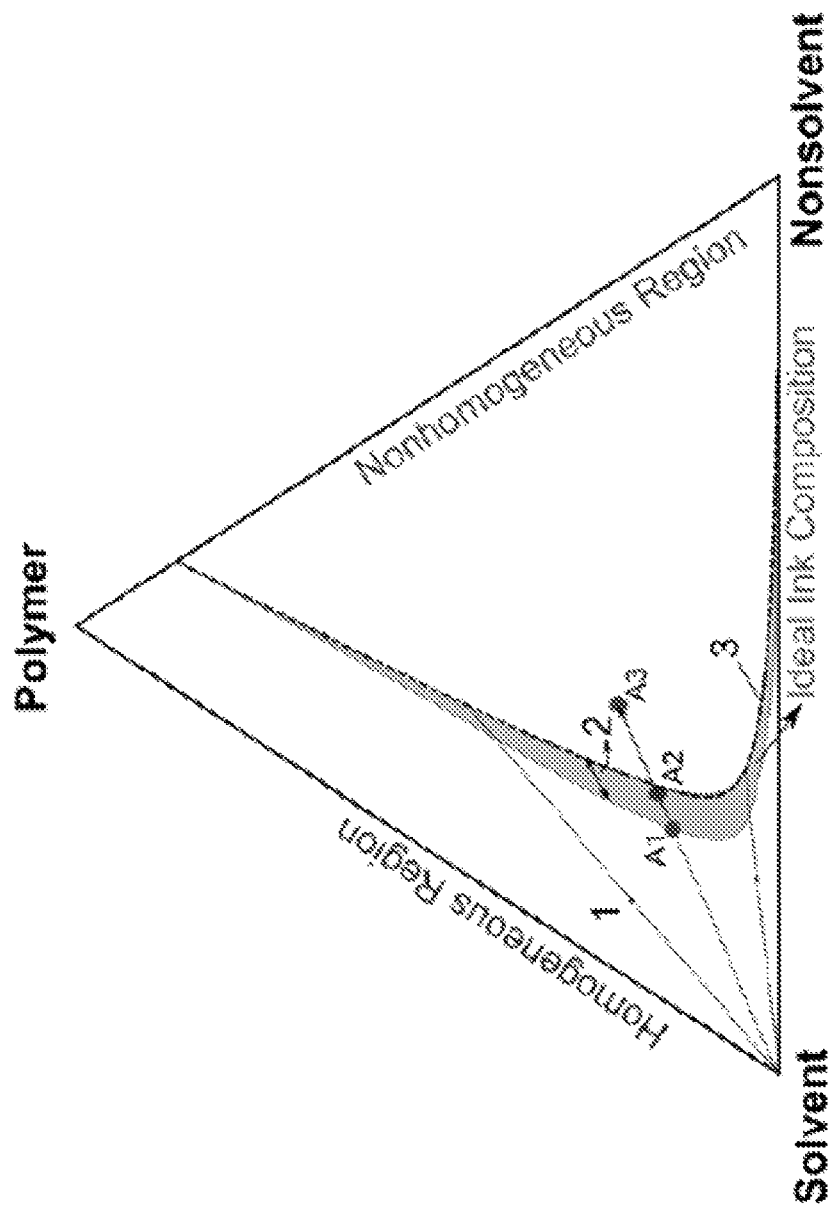
FIG. 1 shows a ternary phase diagram with homogeneous and nonhomogeneous regions and an ideal ink composition according to some embodiments of a ternary ink solution for additive manufacturing.

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

As described above, a problem with current additive manufacturing techniques is the limitations of polymers that can be manufactured. While techniques exist for additive manufacturing such as 3D printing, stereolithography (SLA), and fused deposition modeling (FDM), these techniques are limited in the polymers that can be used due to the need for polymers with moderate melting points, or polymers that can be photopolymerized or photocross-linked. Many advanced functional polymers exist and would provide technological innovations if the ability to manufacture said polymers existed, but most polymers are incompatible with traditional methods. Polymers such as cellulose derivatives, polyimides, or microporous ladder polymers have exciting application in additive manufacturing but cannot be used due to incompatibility with SLA and FDM. These polymers have potential to be used in additive manufacturing in many industries, such as nanofibers, antiballistic clothing, flexible electronic devices, bioengineering devices, and membranes. Developing solution-based additive manufacturing techniques able to print any desired polymer would greatly extend the design space and capabilities of polymer-based devices and structures.

Disclosed herein is a polymeric solution-based ink for additive manufacturing. Inks used for additive manufacturing have the ability to phase change from a liquid ink phase to a solid phase once extruded in a 3D structure. SLA utilizes polymers which can melt easily to form a liquid ink and solidify at room temperature, while FDM used light activation to solidify the polymeric structures. Attention is turned to multicomponent solutions such as ternary solutions comprising at least: a polymer, a volatile solvent compound, and a nonsolvent compound. In some embodiments, the multicomponent solution can comprise at least one polymer, at least one volatile solvent compound, and at least one nonsolvent compound. In some embodiments, the solution can further comprise additives such as multipole polymers, volatile nonsolvent compounds inhibitors, etc. The aforementioned solution can comprise the three components in such a ratio that the polymer is substantially dissolved in the solution to create a liquid ink phase. After extruding the ink onto a substrate, the volatile solvent compound begins to evaporate spontaneously, which drives a phase inversion from a liquid ink phase to a solid phase. As the solution solidifies, the extruded 3D polymeric structure is created on the substrate. Such an embodiment can provide the ability to use any desired polymer in 3D printing, so long as appropriate volatile solvent and nonsolvent compounds are selected. This is due to the spinodal decomposition of a ternary solution. Selecting an ink composition such that evaporation of a small amount of the volatile solvent compound will drive the solution composition into the unstable region of phase equilibria will cause a phase inversion of the solution to create a solid polymer-rich phase. In other words, the evaporation of the volatile solvent compound causes the liquid ink solution to be unstable, and, in an effort to become more stable, drives the solidification of the polymer.

Also disclosed herein are additive manufacturing devices for printing the presently disclosed ink, such as a direct ink writing 3D printer. Because the presently disclosed multicomponent ink is able to evaporate the volatile solvent compound and solidify spontaneously, measures must be taken to ensure the ink does not solidify before reaching the substrate. Consequently, the presently disclosed 3D printer can provide an additional vapor nozzle and control volume shell. The vapor nozzle can then inject a vapor comprising the volatile solvent compound to the control volume shell. Such an embodiment would saturate the atmosphere surrounding the ink and prevent or slow the evaporation of the volatile solvent compound from the ink until the solution reaches the substrate. The vapor nozzle can further be configured to saturate the atmosphere around the substrate to better control the rate of evaporation of the volatile solvent compound from the ink once printed. Also disclosed herein are methods of additive manufacturing utilizing the same.

Disclosed herein are methods of solution-based additive manufacturing comprising a ternary ink solution. In some embodiments, the ternary ink solution can comprise a polymer, a volatile solvent compound, and a nonsolvent compound. Suitable examples of a polymer can include, but are not limited to, biopolymers, inorganic polymers, organic polymers, conductive polymers, copolymers, fluoropolymers, polyterpenes, phenolic resins, polyanhydrides, polyketones, polyesters, polyimides (such as Matrimid 5218 or 6FDA-DAM), polyolefins, rubbers, silicones, silicone rubbers, superabsorbent polymers, synthetic rubbers, vinyl polymers, or a combination thereof. Other suitable examples of the polymer can include, but are not limited to, polyester resin, polyurethanes, polyurea, vulcanized rubber, bakelite, duroplast, urea formaldehyde, melamine resin, diallyl phthalate, epoxy resin, benzoxazines, polyimides, bismaleimides, cyanate esters, furan resins, silicone resins, thiolyte, vinyl ester, acrylic, polymethyl methacrylate, acrylonitrile butadiene styrene, chlorinated polyvinyl chloride, nylon, polylactic acid, polybenzimidazole, polycarbonate, polyether sulfone, polyoxymethylene, polyether ether ketone, polyethylene, polyphenylene sulfide, polypropylene, polystyrene, polyvinyl chloride, polyvinylidene fluoride, polytetrafluoroethylene, polyisoprene, polybutadiene, chloroprene, butyl rubber, halogenated butyl rubber, styrene butadiene, nitrile rubber, halogenated nitrile rubber, ethylene propylene rubber, ethylene propylene diene rubber, epichlorohydrin rubber, polyacrylic rubber, silicone rubber, fluorosilicone, fluoroelastomers, perfluoroelastomers, polyether block amides, chlorosulfonated polyethylene, ethylene vinyl acetate, thermoplastic elastomers, polysulfide rubber, cellulose acetate (CA), polymer of intrinsic micro porosity 1 (PIM-1), or a combination thereof. Additional examples of suitable polymers useable include substituted or unsubstituted polymers and may be selected from polysulfones; poly(styrenes), including styrene-containing copolymers such as acrylonitrilestyrene copolymers, styrene-butadiene copolymers and styrene-vinylbenzylhalide copolymers; polycarbonates; cellulosic polymers, such as cellulose acetate-butyrate, cellulose propionate, ethyl cellulose, methyl cellulose, nitrocellulose, etc.; polyamides and polyimides, including aryl polyamides and aryl polyimides; polyethers; polyetherimides; polyetherketones; polyethersulfones; poly(arylene oxides) such as poly(phenylene oxide) and poly(xylene oxide); poly(esteramide-diisocyanate); polyurethanes; polyesters (including polyarylates), such as polyethylene terephthalate, poly(alkyl methacrylates), poly(acrylates), poly (phenylene terephthalate), etc.; polypyrrolones; polysulfides; polymers from monomers having alpha-olefinic unsaturation other than mentioned above such as poly (ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly (vinyl ureas), poly(vinyl phosphates), and poly(vinyl sulfates); polyallyls; poly(benzobenzimidazole); polyhydrazides; polyoxadiazoles; polytriazoles; poly (benzimidazole); polycarbodiimides; polyphosphazines; etc., and interpolymers and the like. As would be appreciated by one of ordinary skill in the art, the presently disclosed ink can be compatible with any known and/or future polymers so long as the volatile solvent compound and nonsolvent compound are selected correctly.

As used herein, the term "volatile" refers to a substance which can vaporize readily from a liquid to a vapor at room temperature and atmospheric conditions. The volatile solvent compound can be selected such that the vapor pressure of the volatile solvent compound is greater than the vapor pressure of the nonsolvent compound. The volatile solvent compound can be any substance able to dissolve substantially dissolve the polymer to create a liquid solution at room temperature and pressure. Suitable examples of a volatile solvent can include, but are not limited to, nonpolar solvents, polar aprotic solvents, polar protic solvents, water-miscible solvents, or a combination thereof. There are many examples of appropriate solvents known to one of ordinary skill in the art, but suitable examples can include, but are not limited to, acetaldehyde, acetic acid, acetone, acetonitrile, butanediol, butoxyethanol, butyric acid, diethanolamine, diethylenetriamine, dimethyl acetamide (DMAc), dimethylformamide (DMF), dimethoxy ethane, dimethyl sulfoxide (DMSO), dioxane, ethanol, ethylamine, ethylene glycol, formic acid, furfuryl alcohol, glycerol, methanol, methyl diethanolamine, methyl isocyanide, N-methyl-2-pyrrolidone (NMP), propanol, propanediol, propanoic acid, propylene glycol, pyridine, tetrahydrofuran (THF), triethylene glycol, dimethyl hydrazine, hydrazine, hydrofluoric acid, hydrogen peroxide, nitric acid, sulfuric acid, pentane, cyclopentane, hexane, cyclohexane, benzene, toluene, chloroform, diethyl ether, dichloromethane, or a combination thereof. As would be appreciated by one of ordinary skill in the art, the volatile solvent compound can be selected from any substance able to dissolve the desired polymer at room temperature and pressure with a vapor pressure greater than the nonsolvent compound. In some embodiments, the weight ratio of the volatile solvent compound can be present in an amount such that the polymer dissolves at the additive manufacturing operating conditions in an amount of 10% or greater (e.g., 15% or greater, 20% or greater, 25% or greater, 30% or greater, 35% or greater, 40% or greater, 45% or greater, 50% or greater, or 55% or greater) by weight based on total weight of the ink to form a homogeneous solution. There exist many methods for determining level of solubility of the polymer in the volatile solvent compound and the nonsolvent compound. In some embodiments, the Hildebrand solubility parameters can be determined for the polymer and the volatile solvent compound. In some embodiments, the Hildebrand solubility parameters of the polymer and the volatile solvent compound can have a difference of 3.6 MPa1/2 or less. As would be appreciated by one of ordinary skill in the art, such an embodiment would provide a volatile solvent compound which would be able to dissolve the polymer to create a substantially homogeneous solution.

As used herein, the term "nonsolvent" refers to a substance which is substantially unable to dissolve the polymer at room temperature and pressure. In some embodiments, the volatile solvent compound and nonsolvent compound are selected to construct a desired ternary solution with a specific polymer. For instance, the ternary ink solution can comprise a polymer of intrinsic micro porosity 1 (PIM-1) as the polymer, tetrahydrofuran (THF) as the volatile solvent compound, and dimethylacetamide (DMAc) as the nonsolvent compound. In other words, for a desired printing polymer of PIM-1, THF can be selected as the volatile solvent compound due to its ability to dissolve PIM-1, and DMAc can be selected as the nonsolvent compound due to its lower vapor pressure than THF and inability to dissolve PIM-1. The combination of the three substances can form a ternary ink solution. In some embodiments, the weight ratio of the nonsolvent compound is present in an amount such that the polymer dissolves at the additive manufacturing operating conditions in an amount of 1% or less (e.g., 0.9% or less, 0.8% or less, 0.7% or less, 0.6% or less, 0.5% or less, 0.4% or less, 0.3% or less, 0.2% or less, or 0.1% or less) by weight based on total weight of the ink to form a homogeneous solution. In some embodiments, the Hansen solubility parameters can be determined for the polymer and the volatile solvent compound. In some embodiments, the Relative Energy Difference calculated form the Hansen solubility parameters of the polymer and the nonsolvent compound can be 1 or greater. As would be appreciated by one of ordinary skill in the art, such an embodiment would provide a nonsolvent compound which would be unable to dissolve the polymer.

Figure 2:
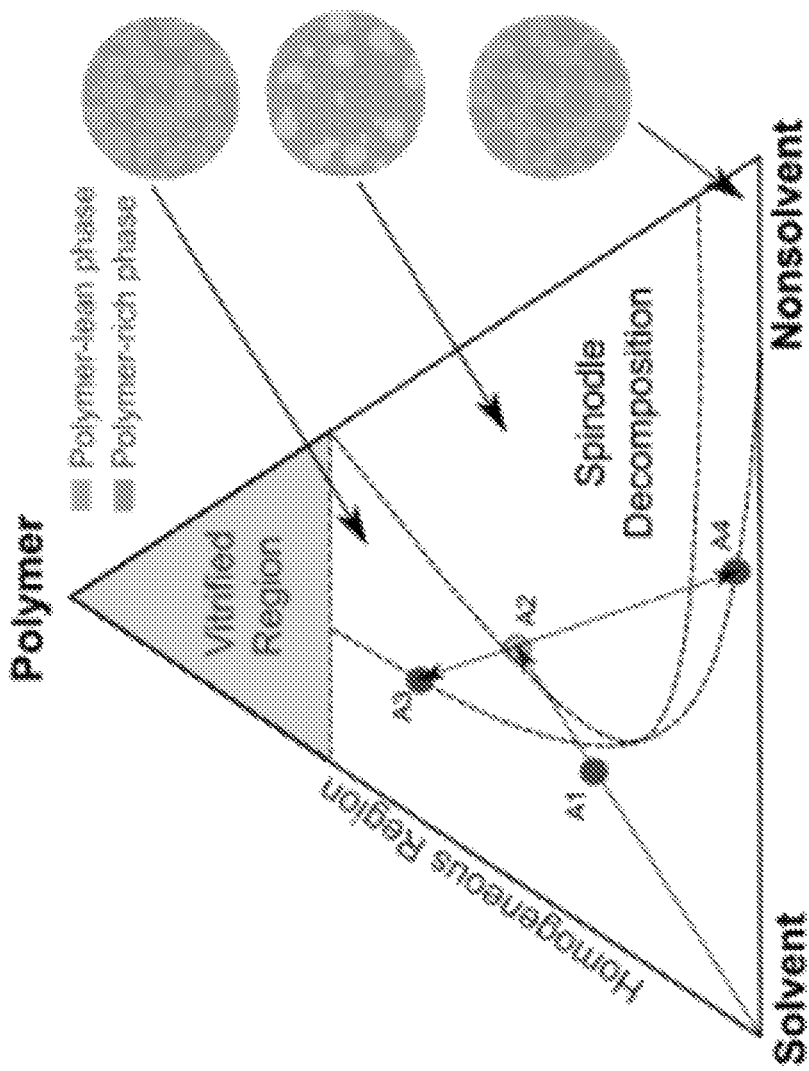
FIG. 2 shows a ternary phase diagram with homogenous and nonhomogeneous regions according to some embodiments of a ternary ink solution for additive manufacturing that can undergo spinodal decomposition.

In some embodiments, the polymer, the volatile solvent compound, and the nonsolvent compound in the ink can be present in any suitable amount to confer a desirable property to the ink. When selecting a volatile solvent compound and nonsolvent compound for the desired polymer, the ternary phase diagram of the ternary ink solution can provide guidance for the phase inversion process. The ternary phase diagram can be constructed using the three components of the ternary system, as shown in FIG. 1. As would be appreciated by one of ordinary skill in the art, such an embodiment would provide a ternary phase diagram comprising a homogenous region, a nonhomogeneous region, and a binodal curve. In such an embodiment, the ink is selected to begin as a stable liquid solution in the homogenous region. As the volatile solvent compound evaporates, the relative polymer concentration increases driving the solution composition across the binodal line into the nonhomogeneous region, creating an unstable solution. Because the solution is thermodynamically unstable in the homogenous region, the solution undergoes a phase inversion to a more thermodynamically stable configuration comprising a solidified polymer-rich phase, and a liquid polymer-lean phase. This phase inversion process can alternatively be called spinodal decomposition. The solidified polymer-rich phase provides the extruded polymeric structure and can be further dried to evaporate any remaining solvent or nonsolvent compound. In some embodiments, the weight ratios of the polymer, volatile solvent compound, and nonsolvent compound are present in an amount such that evaporation at the additive manufacturing operating conditions of 25% or less (e.g., 24% or less, 23% or less, 22% or less, 21% or less, 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, or 1% or less) of the volatile solvent compound by weight based on total weight of the ink results in a phase change in the ink from a liquid ink phase to a solid extruded phase. In some embodiments, the weight ratios of the polymer, volatile solvent compound, and nonsolvent compound are present in an amount such that evaporation at the additive manufacturing operating conditions of 0.1% or greater (e.g., 0.2% or greater, 0.3% or greater, 0.4% or greater, 0.5% or greater, 0.6% or greater, 0.7% or greater, 0.8% or greater, 0.9% or greater, 1% or greater, 5% or greater, 10% or greater, 15% or greater, 20% or greater, or 25% or greater) of the volatile solvent compound by weight based on total weight of the ink results in a phase change in the ink from a liquid ink phase to a solid extruded phase. As would be appreciated by one of ordinary skill in the art, once the ternary solution is selected, the binodal line can be determined by using the cloud-point technique. While the cloud-point technique is known by one of ordinary skill in the art, an exemplary method for performing the cloud-point technique can be found in Kosuri et al. (Kosuri, M. R., Koros, W. J., Journal of Membrane Science, 2008, 320, 65). Such an embodiment would provide for minimal weight loss during the phase change from a liquid ink to a solid printed structure. As shown in FIG. 2, a first composition is selected for the ternary ink solution. Evaporation of the volatile solvent compound drives the solution composition into the nonhomogeneous region where spinodal decomposition occurs. The solution then phase-inverts into a polymer-rich phase and a polymer-lean phase, as desired.

The methods of solution-based additive manufacturing disclosed herein can comprise a direct ink writing printer for printing a ternary ink solution. In some embodiments, the printer can comprise an ink holding container, an ink nozzle configured to attach to the ink holding container, a vapor nozzle, and a moving stage for a substrate. In some embodiments, the moving stage can be configured to detachably attach to a substrate. In some embodiments, the distance between the ink nozzle and the moving stage can comprise an air gap substantially surrounded by a control volume shell. For instance, the control volume shell can comprise a cylindrical shell with an opening for receiving a vapor nozzle. The control volume shell can comprise any hollow shape to substantially surround the ink nozzle and air gap, including but not limited to, cylindrical, conical, rectangular, frusto-conical, elliptical, or any combination thereof.

Figure 3A:
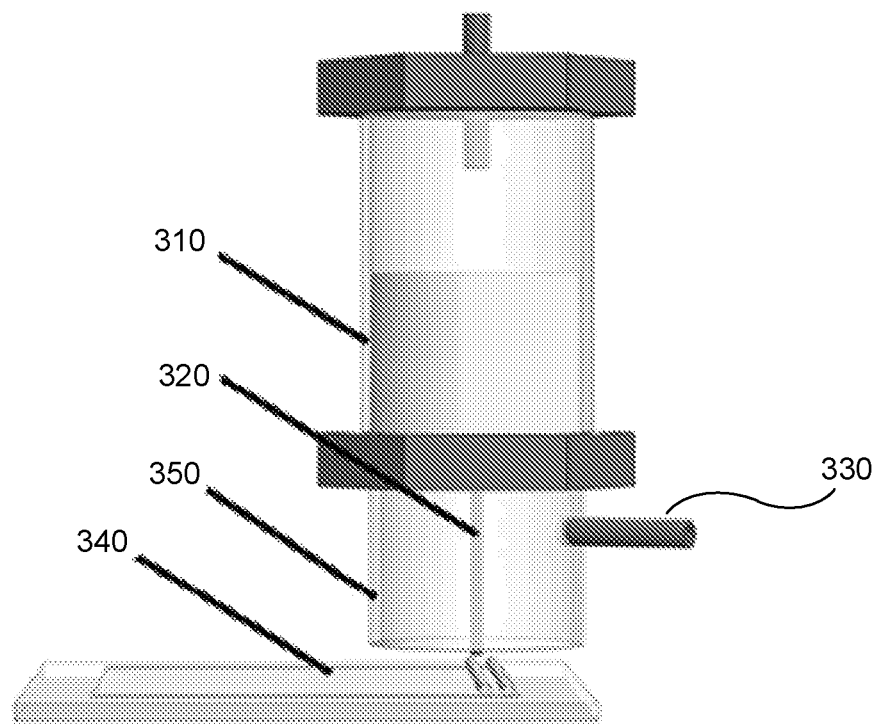
FIG. 3A illustrates a rendering of an exemplary embodiment of a 3D direct ink writing printer for a ternary ink solution.
Figure 3B:
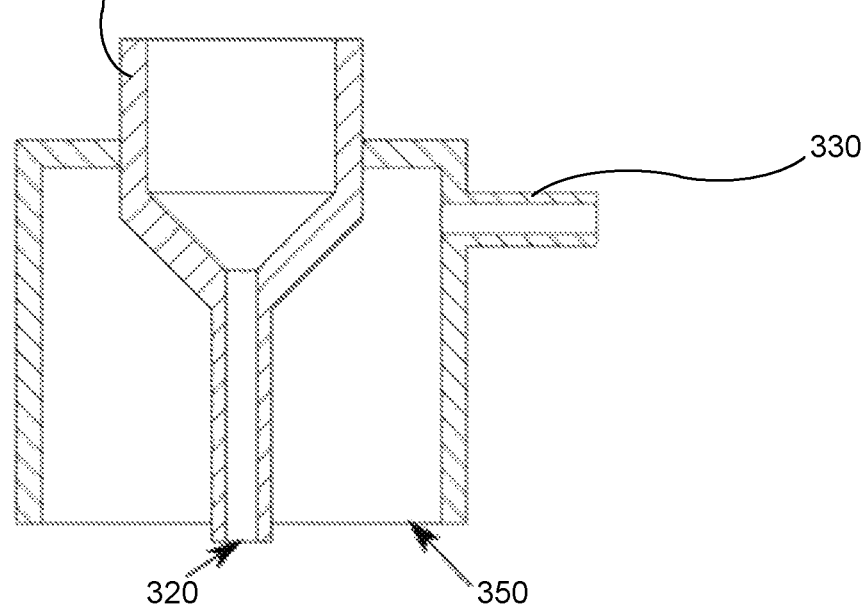
FIG. 3B illustrates a cross-sectional view of an exemplary embodiment of a 3D direct ink writing printer for a ternary ink solution.
Figure 4:
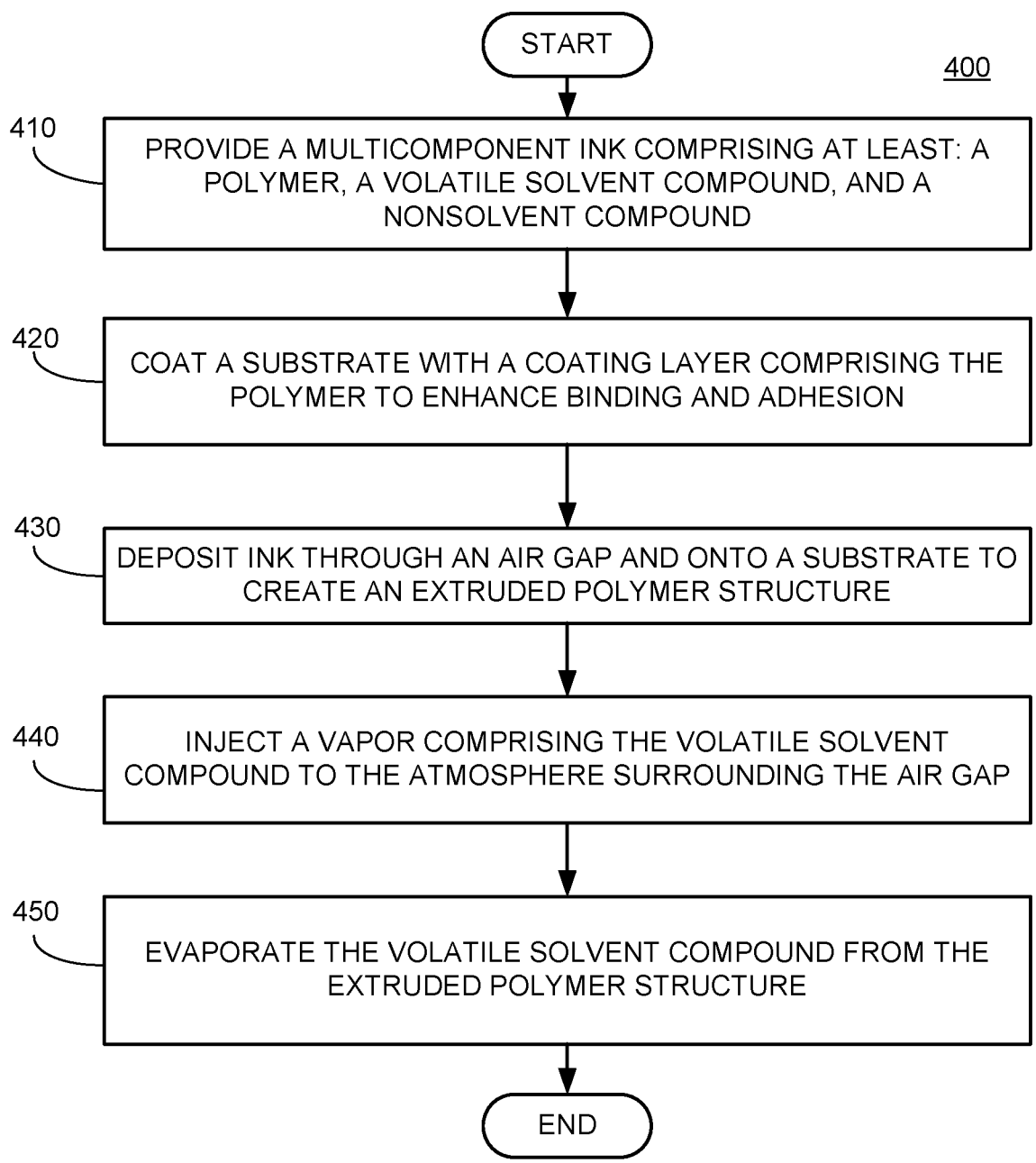
FIG. 4 is a flowchart of an exemplary method for additive manufacturing using a ternary ink solution.
Figure 5:
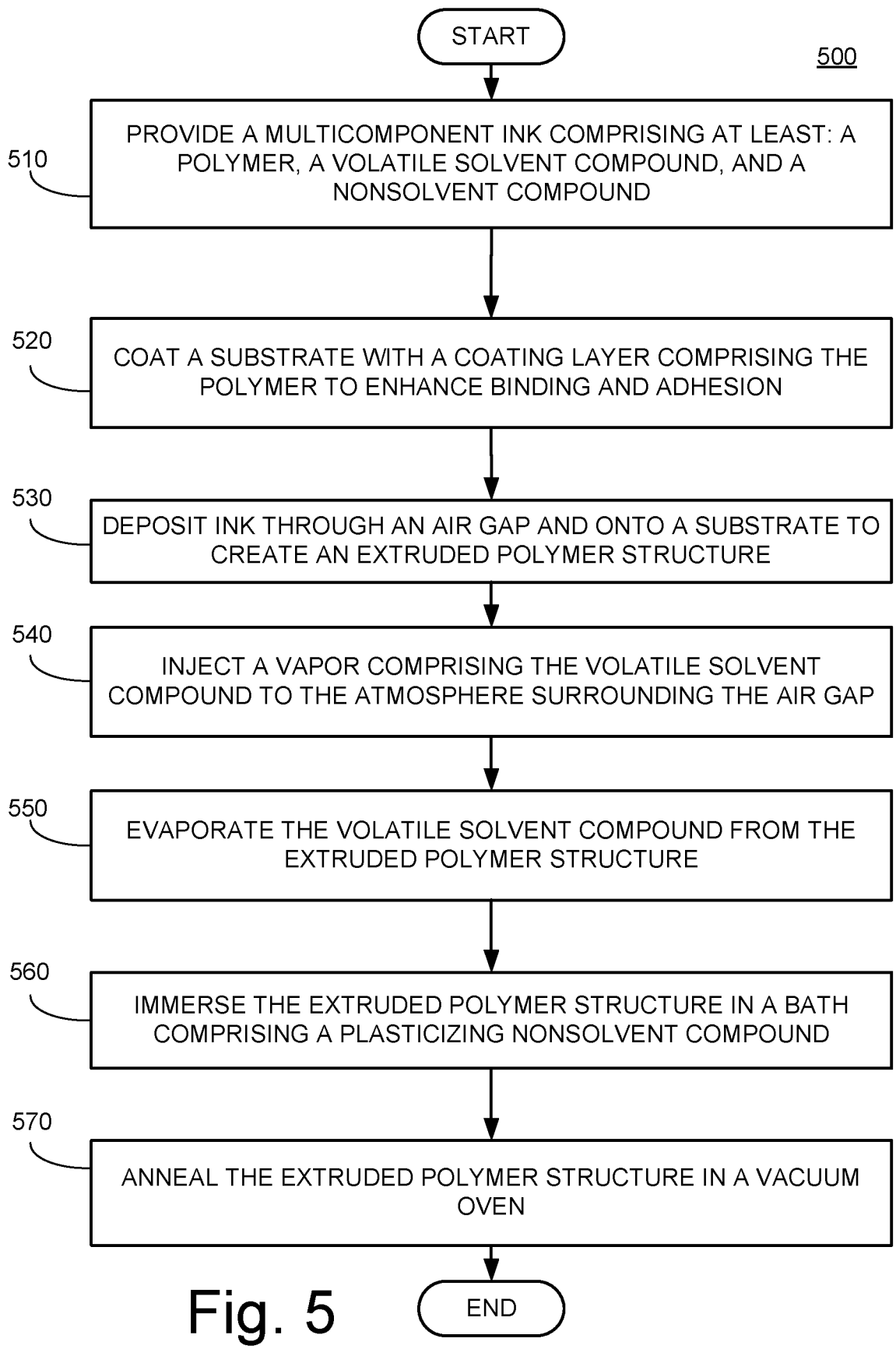
FIG. 5 is a flowchart of an exemplary method for additive manufacturing using a ternary ink solution.
Figure 6:
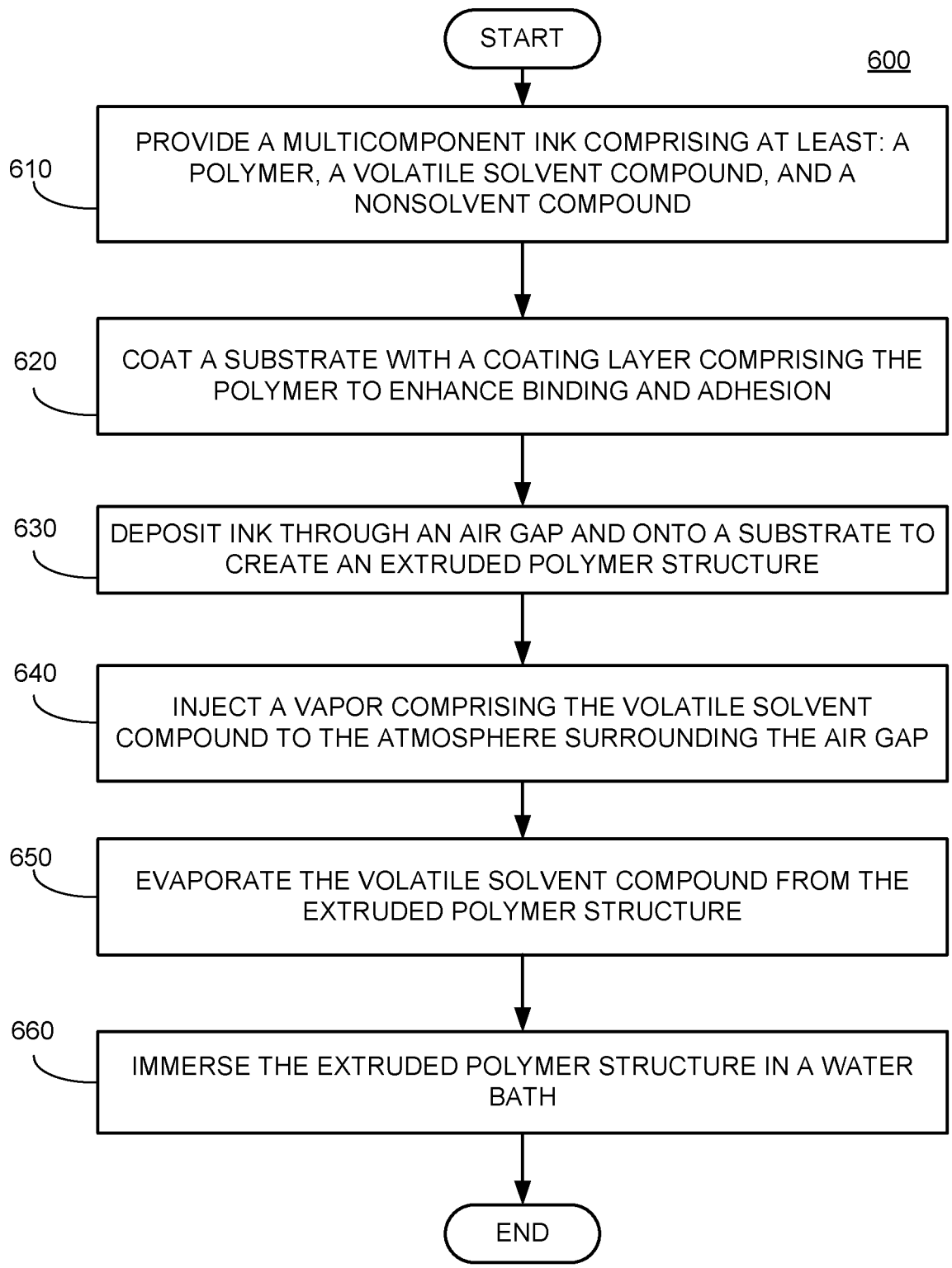
FIG. 6 is a flowchart of an exemplary method for additive manufacturing using a ternary ink solution.
Figure 7A:
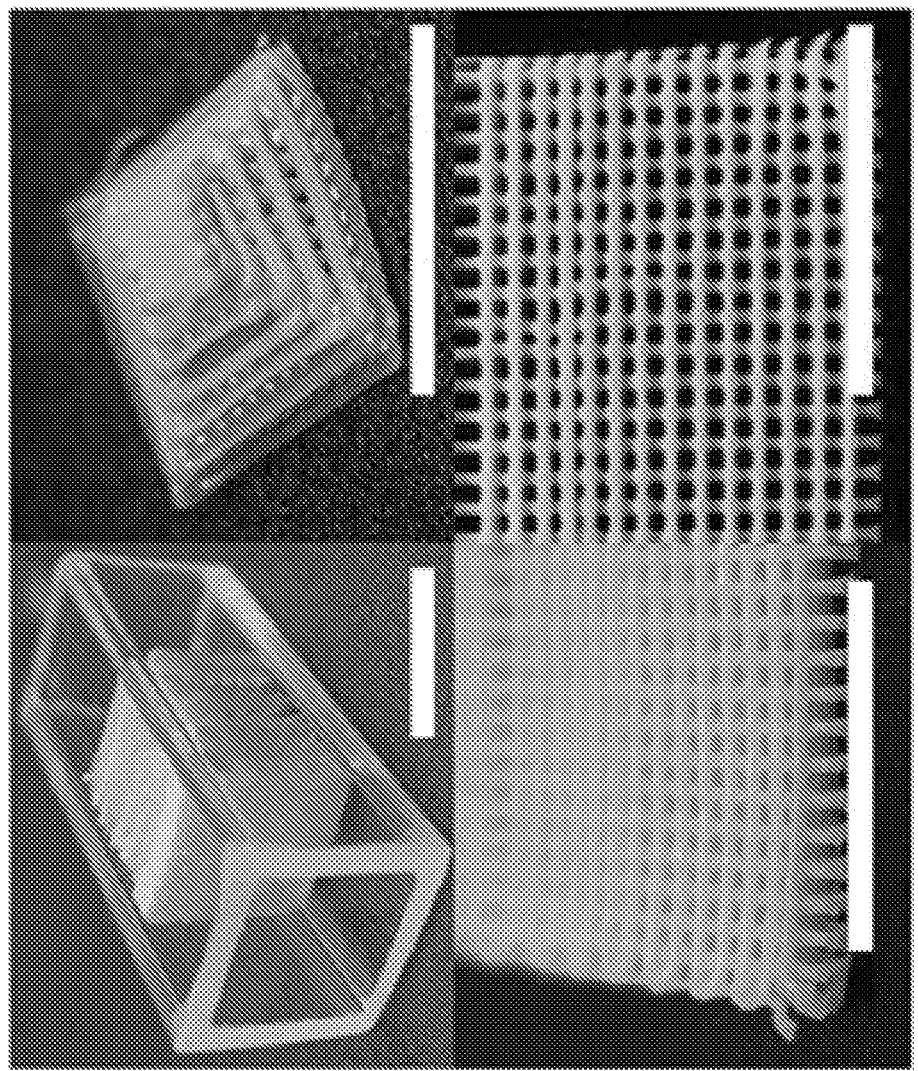
FIG. 7A is an optical photograph of some embodiments of an extruded polymer structure printed from a ternary ink solution wherein the scale bars represent 1 mm.
Figure 7B:
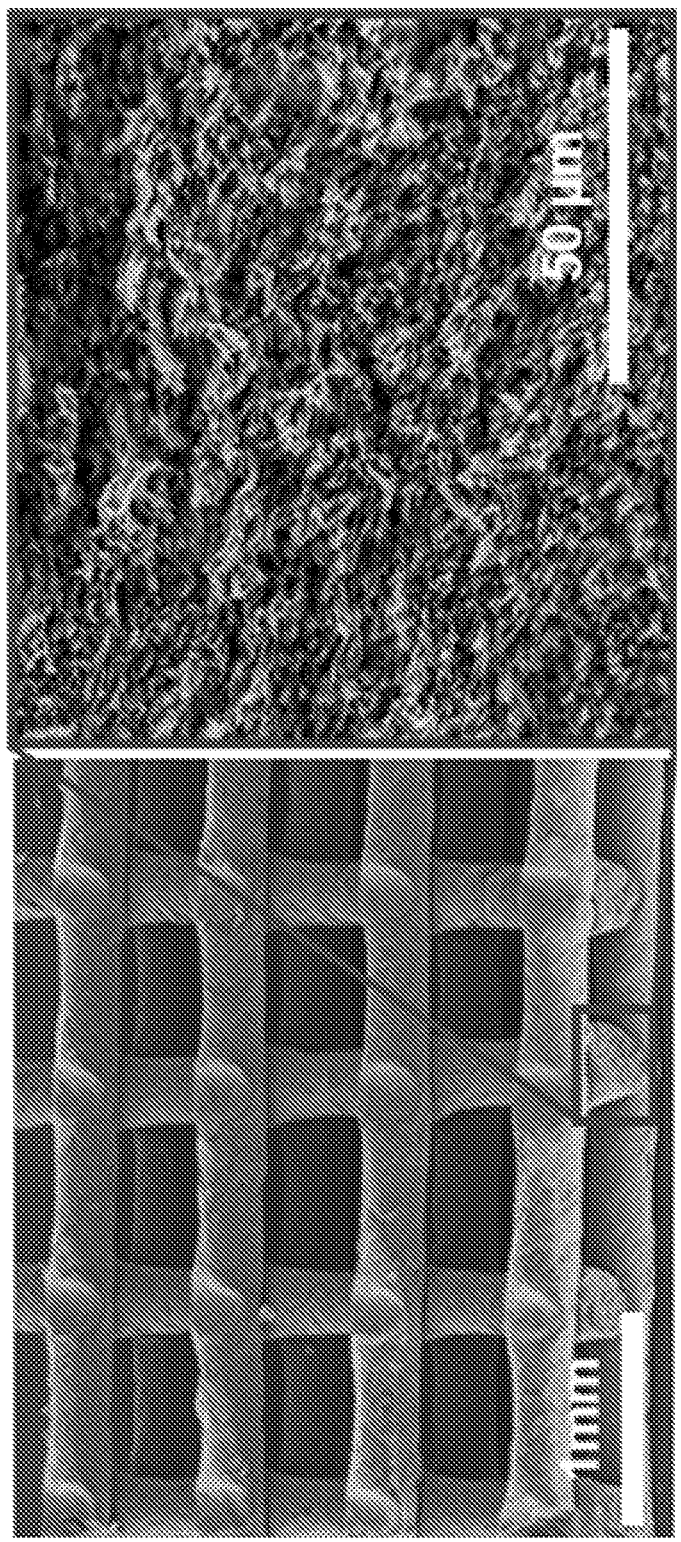
FIG. 7B is a Scanning Electron Microscope (SEM) image of an exemplary embodiment of an extruded polymer structure printed from a ternary ink solution.

As shown in FIGS. 3A-B, the printer can comprise an ink holding container 310, an ink nozzle 320, a vapor nozzle 330, a moving stage for a substrate 340, and a control volume shell 350 configured to substantially surround the air gap between the ink nozzle and the substrate. In some embodiments, the vapor nozzle 330 can provide a feed of vapor comprising the volatile solvent compound to the control volume shell 350. As would be appreciated by one of ordinary skill in the art, such an embodiment would provide the user control over the atmosphere surrounding the ink in the air gap during the printing process to adjust the rate of evaporation of the volatile solvent compound from the ink. Due to the nature of the volatile solvent compound evaporating from the liquid ink to create a solid extruded polymer structure, control over the atmosphere surrounding the extruded ink is desired in order to better control the solidification properties and other properties of the extruded structure. Such properties can include, but are not limited to, structural integrity, microporosity, macroporosity, flexural strength, tensile strength, density, viscosity, and the like. In some embodiments, the control volume shell 350 can further be configured to provide the vapor feed to the atmosphere substantially surrounding the substrate. Such an embodiment would provide further control over the rate of evaporation of the volatile solvent compound and the properties of the extruded polymer structure. In some embodiments, the vapor nozzle 330 can provide a saturated atmosphere to the control volume shell 350 and/or the atmosphere surrounding the substrate 340.

In some embodiments, the ink nozzle 320 and ink holding container 310 can comprise a metal. Suitable examples of a metal can include, but are not limited to, iron alloys, stainless steel, steel, cast iron, aluminum, titanium, copper, magnesium, bronze, brass, alloys, and the like.

In some embodiments, the moving stage 340 can be configured to move laterally. For instance, the moving stage 340 can be configured to move in an x-direction and a y-direction. In other words, the moving stage 340 can be configured to move forwards, backwards, and sideways. In some embodiments, the ink nozzle 320 and ink holding container 310 can be configured to move vertically. For instance, the ink nozzle 320 can be configured to move in a z-direction. In some embodiments, the printer can further comprise one or more stepper motors attached to the moving stage 340 and/or ink nozzle 320. As would be appreciated by one of ordinary skill in the art, such an embodiment would provide the moving stage 340 the ability to step in an x-direction and a y-direction and the ink nozzle 320 the ability to step in a z-direction. In some embodiments, the printer can further comprise one or more controllers attached to the one or more stepper motors configured to control the moving stage 340 and the ink nozzle 320.

In some embodiments, the substrate can comprise a plate comprising a coating layer comprising the desired polymer. In some embodiments, the coating layer can comprise a separate polymer than the desired polymer. As would be appreciated by one of ordinary skill in the art, such an embodiment would provide for improved adhesion and bonding between the extruded polymer structure and the substrate. Suitable examples of materials for a substrate plate can include, but are not limited to, glass, metal, steel, stainless steel, plastic, polymer, brass or a combination thereof.

Also disclosed herein are methods of solution-based additive manufacturing comprising a ternary ink solution and a direct ink writing printer. In some embodiments, the method can comprise the steps of providing an ink comprising a polymer, a volatile solvent compound, and a nonsolvent compound, and depositing the ink through an air gap and onto a substrate to create an extruded polymer structure. In some embodiments, the method can further comprise evaporating the volatile solvent compound. In some embodiments, the method can further comprise drying the extruded polymer structure at a low temperature to remove residual solvent. In some embodiments, the method can further comprise washing the extruded polymer structure with two or more nonsolvent compounds. In some embodiments, the method can further comprise extruding the ink through a nozzle or a pneumatic micronozzle. In some embodiments, the method can further comprise coating the substrate with a coating layer comprising the polymer to enhance binding between the extruded polymer structure and the substrate. In some embodiments, the substrate can comprise a plate comprise the polymer to enhance binding. In some embodiments, the method can further comprise injecting a vapor comprising the volatile solvent compound to a shell substantially surrounding the nozzle and the air gap using a vapor nozzle. In some embodiments, the method can further comprise saturating the atmosphere in the shell or around the extruded polymer structure such that the evaporation of the volatile solvent compound from the ink is slowed. In some embodiments, the method can further comprise moving the substrate laterally and moving the nozzle vertically. In some embodiments, the method can further comprise controlling the diameter of the ink extrusion by adjusting the movement speed of the substrate. In some embodiments, the method can further comprise layering two or more layers on the substrate by adjusting the vertical height of the nozzle to create the extruded polymer structure. In some embodiments, the method can further comprise pressurizing the ink. In some embodiments, the method can further comprise cutting the extruded polymer structure off from the substrate. In some embodiments, the method can further comprise immersing the substrate and extruded polymer structure from additive manufacturing in a water bath. In some embodiments, the nonsolvent compound can comprise a volatile nonsolvent compound. In some embodiments, the evaporating can further comprise evaporating the volatile nonsolvent compound. In some embodiments, the method can further comprise immersing the extruded polymer structure in a bath comprising a plasticizing nonsolvent compound. In some embodiments, the method can further comprise annealing the extruded polymer structure in a vacuum oven.

In some embodiments, the additive manufacturing operating conditions can be selected to confer a desirable property to the ink and/or the extruded polymer structure. In some embodiments, the operating temperature of the additive manufacturing process can be 20° C. or greater (e.g., 25° C. or greater, 30° C. or greater, 35° C. or greater, 40° C. or greater, 45° C. or greater, 50° C. or greater, 55° C. or greater, 60° C. or greater, 65° C. or greater, 70° C. or greater, 75° C. or greater, 80° C. or greater, 85° C. or greater, 90° C. or greater, 95° C. or greater, or 100° C. or greater). In some embodiments, the operating temperature of the additive manufacturing process can be 100° C. or less (e.g., 20° C. or less, 25° C. or less, 30° C. or less, 35° C. or less, 40° C. or less, 45° C. or less, 50° C. or less, 55° C. or less, 60° C. or less, 65° C. or less, 70° C. or less, 75° C. or less, 80° C. or less, 85° C. or less, 90° C. or less, or 95° C. or less). In some embodiments, the operating temperature of the additive manufacturing process can be from 20° C. to 100° C. (e.g., from 20° C. to 25° C., from 25° C. to 30° C., from 30° C. to 35° C., from 35° C. to 40° C., from 40° C. to 45° C., from 45° C. to 50° C., from 50° C. to 55° C., from 55° C. to 60° C., from 60° C. to 65° C., from 65° C. to 70° C., from 70° C. to 75° C., from 75° C. to 80° C., from 80° C. to 85° C., from 85° C. to 90° C., from 90° C. to 95° C., or from 95° C. to 100° C.). In some embodiments, the operating temperature of the additive manufacturing process can be 200° C. or less. In some embodiments, the operating temperature of the additive manufacturing process can be 0° C. or greater. In some embodiments, the operating temperature of the additive manufacturing process can be from 0° C. to 200° C. In some embodiments, the operating pressure of the additive manufacturing process can be 0.9 atm or greater (e.g., 1 atm or greater, 1.5 atm or greater, 2 atm or greater, 3 atm or greater, 4 atm or greater, 5 atm or greater, 6 atm or greater, 7 atm or greater, 8 atm or greater, 9 atm or greater, 10 atm or greater, 11 atm or greater, 12 atm or greater, or 13 atm or greater). In some embodiments, the operating pressure of the additive manufacturing process can be 14 atm or less (e.g., 13 atm or less, 12 atm or less, 11 atm or less, 10 atm or less, 9 atm or less, 8 atm or less, 7 atm or less, 6 atm or less, 5 atm or less, 4 atm or less, 3 atm or less, 2 atm or less, 1.5 atm or less, or 1 atm or less).

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

EXAMPLES

The following examples are provided by way of illustration but not by way of limitation.

Example 1

Methods

A desired polymer for printing (Matrimid 5218) was purchased from Ribelin. The polymer powders were dried overnight under vacuum at 120° C. All solvents were anhydrous and purchased from either Sigma Aldrich or Alfa Aesar and used as received. The cloud-point technique was used to determine the binodal boundary of the ternary phase diagram as would be known by one of ordinary skill in the art. Tetrahydrofuran (THF) is chosen as the volatile solvent compound due to its high volatility and ability to dissolve Matrimid 5218. Water is selected as the nonsolvent compound due to its abundance and small environmental impact. After determining the binodal boundary on the ternary phase diagram, a ternary ink is prepared comprising 30% Matrimid 5218, 68% THF, and 2% water, by weight. A cartesian 3D printer was built to process ternary inks. The printer comprises a stainless-steel ink container, a coaxial dual-channel micronozzle for the ink, and a cartesian moving substrate. The ternary ink is prepared in the container, and the container is sealed via Swagelok fittings and placed onto a rotating roller to cure (10 rpm, 80° C.) for at least 3 days. The ink is extruded through a stainless-steel needle (inner diameter of 311 microns) by pressurizing the interior of the container (100 kPa) using a compressed nitrogen gas cylinder. The ink is printed at a linear speed of 10 mm/s. A glass plate coated with a thin Matrimid 5218 film is used as the substrate. The ink is printed in a THF-saturated atmosphere using the vapor nozzle.

Example 2

Methods

A desired polymer for printing (Matrimid 5218) was purchased from Ribelin. The polymer powders were dried overnight under vacuum at 120° C. All solvents were anhydrous and purchased from either Sigma Aldrich or Alfa Aesar and used as received. The cloud-point technique was used to determine the binodal boundary of the ternary phase diagram as would be known by one of ordinary skill in the art. Toluene is selected as the nonsolvent compound to enlarge the nonhomogeneous region of the ternary phase diagram. A ternary ink is prepared comprising 30% Matrimid 5218, 50% THF, and 20% toluene, by weight. A cartesian 3D printer was built to process ternary inks. The printer comprises a stainless-steel ink container, a coaxial dual-channel micronozzle for the ink, and a cartesian moving substrate. The ternary ink is prepared in the container, and the container is sealed via Swagelok fittings and placed onto a rotating roller to cure (10 rpm, 80° C.) for at least 3 days. The ink is extruded through a stainless-steel needle (inner diameter of 311 microns) by pressurizing the interior of the container (100 kPa) using a compressed nitrogen gas cylinder. The ink is printed at a linear speed of 10 mm/s. A glass plate coated with a thin Matrimid 5218 film is used as the substrate. The ink is printed in a THF-saturated atmosphere using the vapor nozzle.

Example 3

Methods

An extruded polymer structure is prepared using the method from Example 2. The polymer scaffold is then immersed into a 75% dimethylformamide (DMF), 25% water, by weight, solution (24 hours at 25° C.). The wet scaffold is then wiped and dried in a vacuum oven (85 kPa vacuum, 120° C., 24 hours). This method is able to significantly tune the porosity of the extruded polymer structure.

Example 4

Methods

A desired polymer for printing (PIM-1) was synthesized using techniques known to one of ordinary skill in the art and as outlined in Jue et al. (Jue, M. L., McKay, C. S., McCool, B. A., Finn, M., Lively, R. P., Macromolecules, 2015, 48, 5780). After synthesis, the PIM-1 was washed with dimethylformamide (DMF) and methanol sequentially to remove unreacted monomers and oligomers. The PIM-1 was then vacuum dried overnight at 80° C. to remove residual solvents. All solvents were purchased from Sigma Aldrich or Alfa Aesar and used as received. The cloud-point technique was used to determine the binodal boundary of the ternary phase diagram as would be known by one of ordinary skill in the art. A ternary ink solution is prepared using tetrahydrofuran (THF) as the volatile solvent compound and dimethyl acetamide (DMAc) as the nonsolvent compound. The composition of the ink was prepared to be in a 10:23:17 PIM-1:THF:DMAc ratio, by weight. A cartesian 3D printer was built to process ternary inks. The printer comprises a stainless-steel ink container, a coaxial dual-channel micronozzle for the ink, and a cartesian moving substrate. The ternary ink is prepared in the container, and the container is sealed via Swagelok fittings and placed onto a rotating roller to cure (10 rpm, 50° C.) for at least 12 hours. The ink is extruded through a stainless-steel needle (inner diameter of 311 microns) by pressurizing the interior of the container (350-1300 kPa) using a compressed nitrogen gas cylinder. The ink is printed at a linear speed of 10 mm/s. The ink is printed in a THF-saturated atmosphere using the vapor nozzle.

Example 5

Methods

A desired polymer for printing, cellulose acetate (CA), was obtained. All solvents were purchased from Sigma Aldrich or Alfa Aesar and used as received. The cloud-point technique was used to determine the binodal boundary of the ternary phase diagram as would be known by one of ordinary skill in the art. A ternary ink solution was prepared using acetone as the volatile solvent compound and water as the nonsolvent compound. The composition of the ink was prepared to be in a 23:52:25 CA:acetone:water ratio, by weight. A cartesian 3D printer was built to process ternary inks. The printer comprises a stainless-steel ink container, a coaxial dual-channel micronozzle for the ink, and a cartesian moving substrate. The ternary ink is prepared in the container, and the container is sealed via Swagelok fittings and placed onto a rotating roller to cure (10 rpm, 50° C.) for at least 12 hours. The ink is extruded through a stainless-steel needle (inner diameter of 311 microns) by pressurizing the interior of the container (350-1300 kPa) using a compressed nitrogen gas cylinder. The ink is printed at a linear speed of 10 mm/s. The ink is printed in an acetone-saturated atmosphere using the vapor nozzle.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

What is claimed is:

1. A method of additive manufacturing comprising:
   depositing, through an air gap and onto a substrate, a polymer solution comprising a polymer, a volatile solvent compound, and a nonsolvent compound; and
   evaporating at least a portion of the volatile solvent compound, forming an extruded polymer structure;
   wherein the weight ratios of the polymer, volatile solvent compound, and nonsolvent compound are present in an amount such that evaporation, at 23° C. and 1 atm, of 20% or less of the volatile solvent compound by weight based on total weight of the polymer solution results in a phase change in the polymer solution from a liquid polymer solution phase to a solid extruded phase.

2. The method of claim 1, wherein the polymer solution comprises an ink.

3. The method of claim 1 further comprising washing the extruded polymer structure.

4. The method of claim 3 further comprising post-treating the extruded polymer structure to remove residual volatile solvent compound.

5. The method of claim 1, wherein depositing comprises depositing with a pneumatic micronozzle.

6. The method of claim 1 further comprising coating the substrate with a polymer coating layer prior to depositing the polymer solution to enhance binding between the extruded polymer structure and the substrate.

7. The method of claim 1 further comprising injecting a vapor into a shell using a vapor nozzle;
   wherein the shell substantially surrounds the vapor nozzle.

8. The method of claim 7 further comprising saturating, with the vapor, an atmosphere in the shell gap such that the evaporation of volatile solvent compound from the polymer solution is slowed.

9. The method of claim 7 further comprising saturating, with the vapor, an atmosphere surrounding the extruded polymer structure to slow the evaporation of volatile solvent compound.

10. The method of claim 2 further comprising pressurizing the ink.

11. The method of claim 1 further comprising immersing the substrate and the extruded polymer structure in a water bath after printing a 3D structure.

12. The method of claim 1, wherein the polymer solution comprises a ternary solution of the polymer, the volatile solvent compound, and the nonsolvent compound;
   wherein the method further comprises evaporating at least a portion of the nonsolvent compound; and
   wherein the nonsolvent compound comprises a volatile nonsolvent compound.

13. The method of claim 1 further comprising immersing the extruded polymer structure in a bath comprising a plasticizing nonsolvent compound.

14. The method of claim 1 further comprising annealing, in a vacuum oven, the extruded polymer structure.

15. The method of claim 1, wherein the Hildebrand solubility parameters of the polymer and volatile solvent compound have a difference of 3.6 MPa$^{1/2}$ or less.

16. The method of claim 15, wherein the Relative Energy Difference calculated from the Hansen solubility parameters of the polymer and the nonsolvent compound is 1 or greater.

17. The method of claim 16, wherein the volatile solvent compound has a vapor pressure greater than the nonsolvent compound.

18. The method of claim 17, wherein the weight ratios of the polymer, volatile solvent compound, and nonsolvent compound are present in an amount such that evaporation, at 23° C. and 1 atm, of 1% or less of the volatile solvent compound by weight based on total weight of the polymer solution results in a phase change in the polymer solution from a liquid polymer solution phase to a solid extruded phase.

19. The method of claim 1, wherein the polymer solution comprises an ink; and
   wherein the weight ratio of the volatile solvent compound is present in an amount such that, when the ink is at 23° C. and 1 atm, the polymer is dissolved in an amount of 10% or greater by weight based on total weight of the ink to form a homogeneous solution.

20. The method of claim 1 further comprising:
moving the substrate;
non-thermal post-treating the extruded polymer structure; and
washing the post-treated extruded polymer structure;
   wherein depositing the polymer solution comprises depositing through a pneumatic micronozzle the polymer solution onto the moving substrate;
   wherein the substrate is at least partially coated by a polymer film that enhances binding between the extruded polymer structure and the substrate;
   wherein evaporating the at least portion of the volatile solvent compound comprises evaporating the at least portion of the volatile solvent compound in the polymer solution as the polymer solution exits the micronozzle and contacts the building extruded polymer structure upon the substrate;
   wherein non-thermal post-treating comprises room-temperature drying; and
   wherein washing comprises washing with a nonsolvent.

21. The method of claim 20 further comprising tuning parameters of the extruded polymer structure.

22. The method of claim 20, wherein the polymer solution comprises a ternary polymer solution of the polymer, the volatile solvent compound, and the nonsolvent compound.

23. The method of claim 21, wherein parameters of the extruded polymer structure are selected from the group consisting of extruded polymer structure interlayer adhesion, microstructure, skin layer and combinations thereof.

24. The method of claim 22 further comprising tuning parameters of the extruded polymer structure;
   wherein parameters of the extruded polymer structure are selected from the group consisting of extruded polymer structure interlayer adhesion, microstructure, skin layer and combinations thereof; and
   wherein tuning comprises adjusting one or more of ternary polymer solution composition, printing atmosphere, post-treatment conditions, and washing conditions.

25. The method of claim 23, wherein tuning comprises adjusting one or more of polymer solution composition, printing atmosphere, post-treatment conditions, and washing conditions.

* * * * *